(12) United States Patent
Fäcke et al.

(10) Patent No.: US 6,809,126 B2
(45) Date of Patent: Oct. 26, 2004

(54) SOLID, RADIATION-CURING POWDER COATING BINDERS AND A PROCESS FOR PREPARING THE SAME

(75) Inventors: Thomas Fäcke, Bridgeville, PA (US); Jan Weikard, Odenthal (DE); Hanno Brümmer, League City, TX (US); Peter Thometzek, Bergisch Gladbach (DE)

(73) Assignee: Bayer Aktiengesellschaft, Leverkusen (DE)

( * ) Notice: Subject to any disclaimer, the term of this patent is extended or adjusted under 35 U.S.C. 154(b) by 60 days.

(21) Appl. No.: 10/295,082

(22) Filed: Nov. 15, 2002

(65) Prior Publication Data

US 2003/0134125 A1 Jul. 17, 2003

(30) Foreign Application Priority Data

Nov. 19, 2001 (DE) ........................................ 101 56 322

(51) Int. Cl.$^7$ .............................................. C08G 18/62
(52) U.S. Cl. ............................. 522/90; 560/25; 560/26; 560/27; 525/127; 525/404; 525/440; 525/455; 525/461; 525/420
(58) Field of Search ....................... 522/90; 560/25–27; 525/127, 404, 440, 455, 461, 420

(56) References Cited

U.S. PATENT DOCUMENTS

| | | | |
|---|---|---|---|
| 3,974,303 A | 8/1976 | Iwase et al. | 427/27 |
| 5,068,305 A | 11/1991 | Meixner et al. | 528/49 |
| 6,017,640 A | 1/2000 | Muthiah et al. | 428/514 |

FOREIGN PATENT DOCUMENTS

| | | |
|---|---|---|
| DE | 199 39 843 | 3/2001 |
| DE | 199 47 522 | 4/2001 |
| DE | 199 47 523 | 4/2001 |
| WO | 95/35332 | 12/1995 |

*Primary Examiner*—Rachel Gorr
(74) *Attorney, Agent, or Firm*—Joseph C. Gil; Gary F. Matz

(57) ABSTRACT

The present invention relates to powder coating binders containing polyurethanes having (meth)acryloyl groups which are applied onto a substrate, fused with heat and cured by electromagnetic radiation and to a process for preparing the same.

18 Claims, No Drawings

SOLID, RADIATION-CURING POWDER COATING BINDERS AND A PROCESS FOR PREPARING THE SAME

FIELD OF THE INVENTION

The present invention relates to powder coating binders containing polyurethanes having (meth)acryloyl groups which are applied onto a substrate, fused with heat and cured by electromagnetic radiation and to a process for preparing the same.

BACKGROUND OF THE INVENTION

The use of oligo- and polyurethanes as pulverulent binders makes it possible to obtain high quality coatings. While EP-A 410 242 describes the production of such binders in organic solvents, DE-A 19 939 843 describes solvent-free production of pulverulent binders using an elevated fraction by weight of 10 to 95% of a crystalline component which is synthesized from a mono- or diisocyanate and a monohydroxyalkyl (meth)acrylate, wherein the synthesis without solvent is possible only due to the viscosity-reducing action of the molten, crystalline component. DE-A 2 436 186 describes a urethane acrylate which is not stable in storage but is grindable at room temperature.

The disadvantage of the oligo- and polyurethanes described in EP-A 410 242 and DE-A 19 939 843 is poor grindability. The products described in these publications can only be ground without agglomerating at temperatures below 0° C. and all subsequent powder handling must proceed at below room temperature as caking of the powder particles is otherwise observed. It is moreover desirable to reduce the proportion of the components synthesized from a mono- or diisocyanate and a monohydroxyalkyl (meth)acrylate as the toxicological profile of low molecular weight acrylates is disadvantageous in a powder application.

In the case of amorphous materials, glassy properties are determined by investigating the material above and below its glass transition temperature. Below its glass transition temperature, grindable products are obtained. However, if an excessively high glass transition temperature is selected, the products only melt at very high temperatures. The desired glass transition temperature of a powder coating is considerably influenced by the ambient temperatures arising during powder coating.

In summer and, in particular, in the vicinity of the ovens required to fuse the powder coatings, temperatures higher than conventional room temperatures of 20 to 25° C. must be anticipated. In practice, a sufficiently high glass transition temperature is thus required for a powder coating. These two criteria inversely determine one another, i.e., a desired elevated glass transition temperature results in undesirably high viscosities and vice versa.

In order to achieve the lowest possible fusion temperature, an amorphous powder coating material must accordingly have the lowest possible viscosity and simultaneously exhibit the lowest possible glass transition temperature. Elevated ambient temperatures naturally occur in the powder coating process in summer and/or upon exposure to sunlight, on extended storage or in the vicinity of fusion ovens. 40° C. may be considered an upper temperature which is not infrequently observed such that blocking resistance is of industrial significance even at these elevated temperatures.

DE-A 2 436 186 describes the production of a radiation-curable urethane acrylate. This compound comprises the reaction product of 1 mole of trimethylolpropane, 3 moles of toluene diisocyanate and 3 moles of hydroxyethyl methacrylate (See Comparison Example 35) and has a glass transition temperature of 43.7° C. and a melt viscosity of 220 Pa·s at 100° C. In comparison, Example 9 (which is according to the invention) with the next higher glass transition temperature of 46.1° C., and according to the short sprayability test after heat treatment of the powders at 40° C. as illustrated in Example 40, illustrates that Example 9, which is according to the invention, is still sprayable after 7.5 hours, while Example 35, which is according to DE-A2 436 186, has already agglutinated after just 2 hours.

The object underlying the invention is thus to provide storage-stable, pulverulent urethane acrylates which are grindable at room temperature, which have no tendency to cake and which may furthermore be produced without solvents and, in comparison with known acrylates, exhibit a particularly low viscosity.

It has now been found that storage-stable powder coatings which are readily grindable at room temperature and which may also be produced without solvents in a melt are obtained if suitable polyols and polyisocyanates are selected and a suitable molecular weight is established. The latter property is achieved by adjusting the feed ratios of the raw materials.

SUMMARY OF THE INVENTION

The present invention relates to a binder for a powder coating composition which contains at least one urethane acrylate having a glass transition temperature within the range of from 45 to 80° C. which is curable with high energy radiation and which, without the additives conventional in a coating formulation, exhibits a melt viscosity η at 100° C. of less than 1000 Pa·s, provided that the urethane acrylate is not the reaction product of 1 mole of trimethylolpropane, 3 moles of toluene diisocyanate and 3 moles of hydroxyethyl methacrylate.

The present invention also relates to a process for preparing a binder for a powder coating composition from polyurethanes containing (meth)acryloyl groups without using organic solvents which is curable with high energy radiation and which, without the additives conventional in a coating formulation, exhibits a melt viscosity η at 100° C. of less than 1000 Pa·s, by reacting:

A) one or more di- or polyisocyanates or mixtures thereof, optionally with the addition of one or more monoisocyanates;

B) one or more di- or polyfunctional isocyanate-reactive compounds or mixtures thereof; and C) one or more monofunctional isocyanate-reactive compounds;

wherein 1.) the ratio of NCO groups in A) to the sum of the equivalents of isocyanate-reactive groups in B) and C) is between 0.8 and 1.2 and (meth)acryloyl groups are present either in B) or C) or in both B) and C), such that 2.) the ratio of the equivalents of isocyanate-reactive groups on monofunctional compounds C) to the equivalents of isocyanate-reactive groups on the di or polyfunctional compounds B) is less than 1.2 and 3.) the di or polyfunctional isocyanate-reactive compounds B) have an average functionality of less than 2.5; and 4.) the proportion by weight of soft groups in the di- or polyfunctional isocyanates and in the di- or polyisocyanate-reactive components is less than 25 wt. %, based on the total weight of A), B) and C).

The present invention further relates to the use of the binders according to the invention for powder coatings for coating substrates of wood, metal, plastics, mineral substances and/or precoated substrates made therefrom, or substrates made therefrom which contain any desired combinations of the stated materials. Applications which may in particular be mentioned are in the industrial coating of MDF sheets, preassembled high-grade products which already contain temperature-sensitive sub-assemblies, together with the coating of furniture, coils, everyday articles, automotive bodies and parts attached thereto. The urethane acrylates according to the invention may here also be used in combination with one another or with other binders conventional in powder coating chemistry, for example with polyesters, polyacrylates, polyethers, polyamides, and polycarbonates which may also optionally contain unsaturated groups.

DETAILED DESCRIPTION OF THE INVENTION

According to the invention, the term equivalent (eq) relates, as is usual in chemical notation, to the relative number of reactive groups present in the reaction. According to the invention, these are isocyanate-reactive groups such as alcohols or amines. Thus, in the case of alcohols, when 1 mole of monoalcohol=1 equivalent and 1 mole of diol (i.e. 2 moles of OH groups)=2 equivalents are used, a ratio according to the invention of 1 eq: 2 eq=0.5 is obtained.

The phrase an "average functionality of polyfunctional isocyanate-reactive compounds" as used herein describes the arithmetic mean of the quantities of the polyfunctional isocyanate-reactive compounds weighted by the functionality thereof, i.e., the average number of functional groups per molecule in a mixture. If, for example, 1 mole of trimethylolpropane (functionality 3) and 2 moles of ethylene glycol (functionality 2) are used, an average functionality of 1 mole/(1 mole+2 moles)·3+2 mole/(1 mole+2 moles)·2=2.33 is obtained.

The phrase "proportion by weight of soft groups" as used herein, relates to the chemical substructures in the at least difunctional structural components. These chemical substructures include:

1) acyclic methylene groups (—$CH_2$—);
2) —CHR—, —$CR_2$ groups which only have oxygen atoms and/or methylene groups adjacent thereto, and R represents a group with at most 16 carbon atoms which does not co-react during urethanisation/urea formation;
3) ether oxygen atoms;
4) thioether sulfur atoms;
5) di- and or polysulfide sulfur groups;
6) —O—Si(Me)$_2$—O— groups; and
7) olefin groups (—CH=CH—).

The proportion by weight of soft groups of an individual at least difunctional structural component may be calculated, for example for hexanediol, as the proportion by weight of the 6 methylene groups to the total molecular weight (in this case: 6·14/118=71%), for isophorone diisocyanate (1 acyclic methylene group=14/222=6.3%), for diethylene glycol (4 methylene groups, 1 ether oxygen: (4·14+1·16)/106= 67.9%), for propylene glycol (1 methylene group, 1 CHR group substituted with a methyl group: (14+(15+13))/76= 55.2%), for toluene diisocyanate (no soft group, thus 0%). The proportion by weight according to the invention of soft groups of the urethane acrylate is then calculated from the sum of proportions by weight of the at least difunctional structural components, in each case weighted by the soft proportion contents as described above. This calculation is here performed according to Example 15: soft proportion content in %=12.49 g of butanediol/75 g total weight·62.2% soft proportion of butanediol+46.65 g of isophorone diisocyanate/75 g total weight·6.3% soft proportion of isophorone diisocyanate=14.27% soft proportion.

The isocyanates A) may be aliphatic or aromatic. Examples include cyclohexyl isocyanate, butyl isocyanate, phenyl isocyanate, tolyl isocyanate, 1,4-tetramethylene diisocyanate, 1,6-hexamethylene diisocyanate (HDI), 1,8-octamethylene diisocyanate, 1,11-undecamethylene diisocyanate, 1,12-dodecamethylene diisocyanate, 2,2,4- and 2,4,4-trimethyl-1,6-hexamethylene diisocyanate (TMDI), 1,3- and 1,4-cyclohexane diisocyanate, 1-isocyanato-3-isocyanatomethyl-3,5,5-trimethylcyclohexane (IPDI), 1-isocyanato-1-methyl-4(3)-isocyanatomethylcyclohexane (IMCI), 1,4-phenylene diisocyanate, 1,5-naphthylene diisocyanate, 1-isocyanato-2-isocyanatomethylcyclopentane, (4,4'- and/or 2,4'-) diisocyanatodicyclohexylmethane (H12-MDI), bis(4-isocyanato-3-methylcyclohexyl)methane, xylylene diisocyanate (XDI), α,α,α',α'-tetra-methyl-1,3- and/or -1,4-xylylene diisocyanate (TMXDI), 1,3- and/or 1,4-hexahydroxylylene diisocyanate (H6-XDI), 2,4- and/or 2,6-hexahydrotolylene diisocyanate (H6-TDI), 2,4- and/or 2,6-toluene diisocyanate (TDI), 4,4'- and/or 2,4'-diphenylmethane diisocyanate (MDI) and the derivatives thereof with urethane, isocyanurate, allophanate, biuret, uretidione, iminooxadiazinedione structural units, providing that they have at least one free NCO group and mixtures thereof. IPDI, TDI, H12-MDI, H6-XDI and mixtures thereof are preferred. TDI, IPDI and H12-MDI are more preferred.

Component B) includes polyols such as ethylene glycol, 1,2- and 1,3-propanediol, isomeric butanediols, neopentyl glycol, 1,6-hexanediol, 2-methyl-1,3-propanediol, 2,2,4-trimethyl-1,3-pentanediol, 2-n-butyl-2-ethyl-1,3-propanediol, glycerol monoalkanoates (such as for example glycerol monostearates), dimer fatty alcohols, diethylene glycol, triethylene glycol, tetraethylene glycol, 1,4-dimethylolcyclohexane, dodecanediol, bisphenol A, hydrogenated bisphenol A, 1,3-hexanediol, 1,3-octanediol, 1,3-decandiol, 3-methyl-1,5-pentanediol, 3,3-dimethyl-1,2-butanediol, 2-methyl-1,3-pentanediol, 2-methyl-2,4-pentanediol, 3-hydroxymethyl-4-heptanol, 2-hydroxymethyl-2,3-dimethyl-1-pentanol, glycerol, trimethylolethane, trimethylolpropane, trimer fatty alcohols, isomeric hexanetriols, sorbitol, pentaerythritol, ditrimethylolpropane, dipentaerythritol, diglycerol and 4,8-bis(hydroxymethyl)-tricyclo[$5.2.0^{2.6}$]-decane (TCD alcohol).

According to the invention, it is also possible to use OH-functional esters with a weight average molecular weight<2000, preferably <500, which are obtained by reacting the above-stated polyols with ε-caprolactone. Unsaturated esters may also be used, which, apart from the stated alcohols, contain unsaturated acids or alcohols, such as maleic acid/anhydride, fumaric acid, itaconic acid, citraconic acid/anhydride, aconitic acid, tetrahydrophthalic acid/ anhydride, 3,6-endomethylene-1,2,3,6-tetrahydrophthalic acid/anhydride and butenediols.

Alcohols and amines comprising (meth)acryloyl groups may also be considered, as may reaction products substantially containing such alcohols and amines which are obtained by the condensation of n-functional alcohols or amines or aminoalcohols with (meth)acrylic acid, wherein mixtures may also be used as the alcohols, amines or aminoalcohols. These compounds or product mixtures include, for example, the reaction products of glycerol, trimethylolpropane and/or pentaerythritol, of low molecular weight alkoxylation products of such alcohols, such as ethoxylated or propoxylated trimethylolpropane with (meth)acrylic acid.

According to the invention, isocyanate-reactive groups which are additionally incorporated into the urethane acrylates such as dimethylolpropionic acid (DMPA), N-methyldiethanolamine, N-ethyl-diethanolamine, N-(tert.)-butyldiethanolamine, N-isopropyldiethanolamine, N-n-propyldiethanolamine, N-hexyldiethanolamine, N-phenyl-diethanolamine, N-benzyldiethanolamine, N-tolyldiethanolamine, N-lauryldiethanolamine, N-stearyldiethanolamine, triethanolamine, tris(2-aminoethyl)amine, N,N-bis(2-hydroxyethyl)ethylenediamine, 2-(2-dimethylaminoethylamino)ethanol, 2-(2-diethylaminoethylamino)ethanol, bis-2-(methylaminoethyl)methylamine and 1,4,7-triethyidiethylene-triamineare can also used. Mixtures of different urethane acrylates, which contain on the one hand DMPA and on the other an above-described tertiary amine, are optionally also produced.

The following amines may also be used instead of or in combination with a polyol in order to produce urea acrylates: ethanolamine, N-methyl-ethanolamine, N-ethylethanolamine, 2-amino-1-propanol, tetramethylxylylenediamine, ethylenediamine, 1,6-hexamethylenediamine, isophoronediamine (IPDA), (4,4'- and/or 2,4'-)diaminodicyclohexyl-methane, and (4,4'- and/or 2,4'-)diamino-3,3'-dimethyldicyclohexyl-methane.

All the stated di- or polyfunctional isocyanate-reactive substances may also be used in mixtures.

Preferred substances are ethylene glycol, 1,2- and 1,3-propanediol, isomeric butanediols, neopentyl glycol, 1,6-hexanediol, 2-ethyl-1,3-hexanediol, perhydrobisphenol and 4,8-bis(hydroxymethyl)ricyclo[5.2.0(2.6)]-decane (TCD alcohol). Ethylene glycol, 1,2-propanediol and 1,4-butanediol are more preferred.

Compounds suitable as component C) are aliphatic and aromatic alcohols such as methanol, ethanol, N-propanol, isopropanol, butanol, hexanol, fatty alcohols and phenols, as well as in particular hydroxyalkyl (meth)acrylates with 2 to 12 carbon atoms in the alkyl chain, preferably 2 to 4 carbon atoms in the hydroxyalkyl residue, such as hydroxyethyl (meth)acrylate, 2- and 3-hydroxypropyl (meth)acrylate and 2-, 3- and 4-hydroxybutyl (meth)acrylate, together with OH-functional vinyl ethers, such as hydroxybutyl vinyl ether and mixtures thereof. (Meth)acrylic acid esters/amides of n-functional alcohols or amines or aminoalcohols which contain an average of 0.3–1.5 OH-groups and mixtures thereof are also according to the invention. These compounds or product mixtures include, for example, the esters of glycerol, trimethylolpropane and/or pentaerythritol. Defined monools may also be obtained from the reaction of epoxy-functional (meth)acrylic acid esters with (meth)acrylic acid. The reaction of glycidyl methacrylate with acrylic acid accordingly yields a mixture acrylic acid/methacrylic acid esters of glycerol, which may also advantageously be used. Hydroxyethyl acrylate and the isomeric hydroxypropyl acrylates are preferred.

The reaction of hydroxy-functional acrylates with isocyanates is known and described in, for example, P. K. T. Oldring (ed.), *Chemistry & Technology of UV & EB Formulations For Coatings, Inks & Paints*, Vol. 2, 1991, SITA Technology, London, pp. 73–97.

The process according to the invention may be performed by 1) initially introducing the isocyanate-containing constituents A) and reacting them with B) and C), with perfusion with an oxygen-containing gas, preferably air, at a temperature above the melting point or softening temperature of the product to be produced in the temperature range from 30 to 150° C., preferably, from 70 to 130° C., more preferably, from 80 to 120° C., until, in the case of NCO:OH feed ratios of 1, the NCO value has fallen to the desired value, preferably below 0.3 wt. %, more preferably, below 0.1 wt. %. It may here 2) be convenient to apportion B) and C) separately in succession, separately simultaneously or as a mixture. Apportionment as a mixture is preferred.

It is also possible 3) to initially to introduce B) and C) and to apportion A). Another method 4) which may be advantageous is first to introduce B), then to apportion C) and finally to add A). The sequence of A) and B) in 4) may be swapped in 5). Variant 1) is preferred.

The addition reaction giving rise to the urethane (optionally urea) may be accelerated in known manner by means of suitable catalysts, such as tin octoate, dibutyltin dilaurate or tertiary amines such as dimethyl-benzylamine. The urethane acrylate obtained as the reaction product is conventionally protected from premature and unwanted polymerization by the addition of suitable inhibitors or antioxidants, such as phenols and/or hydroquinones and/or stable N-oxyl radicals and/or phenothiazine or other free radical scavengers in quantities in each case of 0.0005 to 0.3 wt. %, relative to the resin melt. This auxiliary agent may be added before, simultaneously with and/or after the reaction which gives rise to the polyurethane (urea).

In addition to batchwise operation, it is furthermore possible to perform the reactions in a tubular reactor, static mixer or reaction extruder or reaction kneader. The shorter reaction times in this case are advantageous, wherein higher temperatures (for example, 80–200° C.) may also be used.

The powder coatings according to the invention have glass transition temperatures within the range of from 45 to 80° C., preferably, from 45 to 70° C., more preferably, from 45 to 60° C. Melt viscosities should ideally be minimized. This is, however, particularly dependent upon the nature of the structural components and, in this case, additionally upon the molecular weight established, which is considerably determined by the ratio of equivalents of isocyanate-reactive groups on monofunctional compounds to the equivalents of isocyanate-reactive groups on polyfunctional reactive compounds. Here, this ratio is less than 1.2, preferably less than 1.1, more preferably, less than or equal to 1.

The average functionality of the polyfunctional isocyanate-reactive compounds is less than 2.5. Thus, when the glass transition temperature is adjusted to above 45° C., viscosity may be kept to a low value by varying the monool to polyol ratio (See Examples 36–38).

The proportion of soft groups in the at least difunctional structural components according to the above-stated definition must not be higher than 25 wt. %, as it is otherwise no longer possible to produce sufficiently high glass transition temperatures. The products are then not grindable and blocking resistant (See. Example 39).

The polyurethane containing (meth)acrylate groups obtained by the process according to the invention are valuable binders for powder coatings. They may be processed without further additions as thermally crosslinkable powder clear coatings (in which case the binder would be identical to the coating composition) or, preferably, they may be provided with the additives conventional in coatings technology, such as pigments (for example, titanium dioxide) levelling agents (for example polybutyl acrylate or silicones), deaerating agents (for example benzoin), tribological additives (for example aliphatic amines) and/or other additives and homogenized, for example on extruders or kneaders at temperatures within the range from 40 to 140° C., preferably from 70 to 120° C. It is also possible to add the stated auxiliary substances and additives to the reaction mixture or resin melt immediately after the end of, during or at the beginning of production.

The solid obtained is then ground in a manner known per se and coarse grain fractions, preferably at least those of a grain size of above 0.1 mm, are removed by screening.

The pulverulent coating compositions produced according to the invention may be applied onto substrates to be coated using conventional powder application processes, such as electrostatic powder spraying, triboelectric application or fluidised bed coating. The coatings are then initially fused by the action of heat (for example from IR light sources), resulting in the formation of a clear film, provided that no pigments or the like have been incorporated. The necessary temperature is above 50° C., preferably, above 70° C., more preferably, above 90° C. The coatings may be cured either by heating to 130 to 220° C., preferably, to 150 to 190° C., and/or by the action of high energy radiation, such as UV or electron beam radiation. As is known to a person skilled in the art, electron beam radiation is produced by thermal emission and acceleration over a potential difference. The high energy electrons then break through a titanium foil and are guided onto the binders to be cured. The general principles of electron beam curing are described in, for example, *Chemistry & Technology of UV & EB formulations for coatings, inks & paints*, vol. 1, P. K. T. Oldring (ed.), SITA Technology, London, England, pp. 101–157, 1991. No photoinitiator is required for electron beam curing.

In the case of crosslinking by UV radiation, photoinitiators are homogeneously incorporated into the coating compositions. Suitable photoinitiators are the conventionally used compounds provided that they have no negative impact upon powder properties such as flowability and storage stability. Examples of such compounds are 1-hydroxycyclohexyl phenyl ketone, benzil dimethyl ketal or, in the case of pigmented systems, 2-methyl-1-(4-(methylthio)phenyl-2-morpholino-1-propanone or trimethyl benzoyl diphenyl phosphine oxide.

The photoinitiators, which are used in quantities from between 0.1 and 10 wt. %, preferably, from 0.1 to 5 wt. %, relative to the weight of the coating binder, may be used as an individual substance or, due to frequent advantageous synergistic effects, also in combination with another system.

Thermal curing may also proceed with the addition of thermally dissociating free radical formers. As is known to a person skilled in the art, the following are suitable: peroxy compounds (such as diacyl peroxides), benzoyl peroxide, alkyl hydroperoxides (such as diisopropylbenzene), monohydroperoxide, alkyl peresters (such as tert.-butyl perbenzoate), dialkyl peroxides (such as di-tert.-butyl peroxide), peroxydicarbonates (such as dicetyl peroxydicarbonate), inorganic peroxides (such as ammonium peroxydisulfate and potassium peroxydisulfate) and azo compounds (such as 2,2'-azobis[N-(2-propenyl)-2-methylpropionamide], 1-[(cyano-1-methylethyl)azo]formamide, 2,2'-azobis(N-butyl-2-methylpropionamide), 2,2'-azobis(N-cyclohexyl-2-methylpropionamide), 2,2'-azobis{2-methyl-N-[2-(1-hydroxybutyl)]propionamide and 2,2'-azobis{2-methyl-N-[1,1-bis(hydroxymethyl)-2-hydroxyethyl]propionamide).

Particularly suitable initiators are those in solid form with a melting point below 130° C. and a half-life of the order of minutes at a decomposition temperature above 100° C. It is also advantageous when carrying out thermal curing by means of an initiator to minimize the concentration of stabilizers.

It is possible to combine crosslinking by UV radiation (using a photoinitiator) with thermal crosslinking (using a thermally dissociating free radical former). This is described in European patent application EP 844286 A1 for the case of a mixture of an unsaturated resin (unsaturated polyester or unsaturated polyacrylate or unsaturated polymethacrylate or mixtures thereof) with a second copolymerizing resin with vinyl ether, acrylate, methacrylate or allyl ester groups.

The urethane acrylates according to the invention may also be cured in two steps purely thermally or also in combination with UV irradiation. This is particularly advantageous if areas are being coated which, due to the geometry of the substrate, cannot be uniformly irradiated.

The binders according to the invention for powder coatings are suitable for coating substrates of wood, metal, plastics, mineral substances and/or precoated substrates made therefrom, or substrates made therefrom which contain of any desired combinations of the stated materials. Applications which may in particular be mentioned are in industrial coating of MDF sheets, preassembled high-grade products which already contain temperature-sensitive sub-assemblies, for example electronic sub-assemblies, together with coating of furniture, coils, everyday articles, automotive bodies and parts attached thereto.

The urethane acrylates according to the invention may also be used in combination with one another or together with other binders conventional in powder coating chemistry such as with polyesters, polyacrylates, polyethers, polyamides and polycarbonates, which may also optionally contain unsaturated groups. Suitable unsaturated groups are acrylate, methacrylate, fumarate, maleate, vinyl and/or vinyl ether groups. Acrylate and methacrylate groups are preferred. The quantity ratios are determined such that the double bond density of the resultant mixture does not fall below 1.0 mole of double bonds per kilogram, as adequate curing is otherwise no longer possible. If Example 3 according to the invention, with its double bond density of 2.26 mole of double bonds/kg, is considered it follows that in a mixture with a resin containing no double bonds, at least 44% of the urethane acrylate from Example 3 must be present.

The binders according to the invention may also be used as adhesives and sealants. It is a prerequisite in the case of UV radiation curing that at least one of the two substrates to be adhesively bonded or sealed relative to one another must allow UV radiation to pass through, i.e. must as a rule be transparent. In the case of irradiation with electrons, adequate transparency for electrons must be ensured. Suitable substrates are composed of wood, metal, plastics, mineral substances and/or precoated substrates or a mixture of said substrates.

The binders according to the invention are also suitable as curing compositions in casting, injection moulding and pressure casting processes. In this case, an article to be coated is introduced into a mold, wherein a gap of at most 1 cm, preferably of less than 0.3 cm, still remains between the surface of the article and the mould. The binder according to the invention is then introduced into the mold under pressure via an extruder and then cured thermally and/or with radiation.

Due to the high-grade properties of the binders according to the invention, the binders of the present invention are also suitable for the particularly high demands of OEM coating, in particular, for automotive and automotive part coating. Example 42 demonstrates the property of elevated scratch resistance which is of particular importance in automotive coating, as particularly low losses of gloss are found (after deliberate scratching with a washing solution combined with sand).

EXAMPLES

All percentages in the following Examples are percentages by weight.

Examples according to the invention.

Example 1a 599.70 of 1,2-propanediol, 899.55 g of ε-caprolactone and 0.75 g of Desmorapid® SO (available from Bayer AG, Leverkusen, DE) (tin 2-ethylhexanoate) were initially introduced into a vessel at room temperature and heated to 160° C. while being stirred. After 7 hours, the mixture was cooled.

Example 1b 461.10 g of Desmodur® T80 (available from Bayer AG, Leverkusen, DE) (80 wt. % 2,4- and 20 wt. % 2,6-toluene diisocyanate) were initially introduced into a flat-ground jar and dissolved at 90° C. with 0.40 g of 2,5-di-tert.-butylhydroquinone, 1.00 g of 2,6-di-tert.-butyl-4-methylphenol, 0.50 g of Desmorapid® Z (dibutyltin dilaurate) (available from Bayer AG, Leverkusen, DE) and 1.00 g of p-methoxyphenol. A mixture of 156.00 g of hydroxypropyl acrylate and 380.00 g of the product from Example 1 a were then apportioned with evolution of heat and the temperature was maintained at 90° C. After 4 hours of stirring, an NCO content of <0.3 wt. % was achieved. The melt was transferred into an aluminum tray and allowed to cool. The glass transition temperature of the amorphous, glassy, brittle product was 44.9° C. Polydispersity (Mw/Mn) was 2.2. Complex melt viscosity at 100° C. was 300 Pa·s. The ratio according to the invention of equivalents (monoalcohol to dialcohol) was 0.3. The content of soft groups was 22.4%, the average functionality of the polyfunctional isocyanate-reactive compounds was 2.

Example 2

2644.33 g of Desmodur® W [4,4'-diisocyanatodicyclohexylmethane; H 12-MDI] (available from Bayer AG, Leverkusen, DE) were initially introduced into a flat-ground jar and dissolved at 90° C. with 1.60 g of 2,5-di-tert.-butylhydroquinone, 4.00 g of 2,6-di-tert.-butyl-4-methylphenol, 2.00 g of Desmorapid® Z (dibutyltin dilaurate) (available from Bayer AG, Leverkusen, DE) and 4.00 g of p-methoxyphenol. A mixture of 961.81 g of hydroxypropyl acrylate and 382.26 g of 1,2-ethanediol was then apportioned with evolution of heat, the temperature here being maintained at 90° C. As the viscosity of the resin melt rose, the temperature was raised to 120° C. After 4 hours of stirring, an NCO content of <0.3 wt. % was achieved. The melt was transferred into an aluminum tray and allowed to cool. The glass transition temperature of the amorphous, glassy, brittle product was 53.0° C. Complex melt viscosity at 100° C. was 400 Pa·s. The ratio according to the invention of equivalents (monoalcohol to dialcohol) was 0.6. The content of soft groups was 7.8%, the average functionality of the polyfunctional isocyanate-reactive compounds was 2.

Example 3

2425.70 g of Desmodur® I [1-isocyanato-3-isocyanatomethyl-3,5,5-trimethylcyclohexane (IPDI)] (available from Bayer AG, Leverkusen, DE) were initially introduced into a flat-ground jar and dissolved at 90° C. with 1.60 g of 2,5-di-tert.-butylhydroquinone, 4.00 g of 2,6-di-tert.-butyl-4-methylphenol, 2.00 g of Desmorapid® Z (dibutyltin dilaurate) (available from Bayer AG, Leverkusen, DE) and 4.00 g of p-methoxyphenol. A mixture of 1179.24 g of hydroxypropyl acrylate and 383.46 g of 1,2-ethanediol were then apportioned within 3 hours with evolution of heat, the temperature here being maintained at 90° C. As the viscosity of the resin melt rose, the temperature was raised to 116° C. After 1.5 hours of stirring, an NCO content of <0.05 wt. % was achieved. The melt was transferred into an aluminum tray and allowed to cool. The glass transition temperature of the amorphous, glassy, brittle product was 49.2° C. Complex melt viscosity at 100° C. was 400 Pa·s. The ratio according to the invention of equivalents (monoalcohol to dialcohol) was 0.73. The content of soft groups is 8.1%, the average functionality of the polyfunctional isocyanate-reactive compounds was 2.

Example 4

49.91 g of 1,3-bis(isocyanatomethyl)cyclohexane [H6-XDI], 0.03 g of 2,5-di-tert.-butylhydroquinone, 0.07 g of 2,6-di-tert.-butyl-4-methylphenol, 0.07 g of p-methoxyphenol, 12.27 g of 1,2-ethanediol, 12.60 g of 2-hydroxyethyl acrylate were initially introduced into a reaction vessel containing a metal can (preferably made of aluminium), a glass lid with pressure compensation and an orifice for a KPG stirrer, the vessel being temperature-controlled by the can's standing in a metal block. While the mixture was stirred, the temperature was maintained at 80° C. for 1.5 hours and then at 90° C. for 2.25 hours. 0.04 g of Desmorapid® Z (dibutyltin dilaurate) was then added and the mixture was stirred for a further 2 hours. Finally, the mixture was heated to 100° C. for 20 minutes while being stirred. An NCO content of <0.3 wt. % was achieved. The mixture was allowed to cool. The glass transition temperature of the amorphous, glassy, brittle product was 47.0° C. Complex melt viscosity at 100° C. is 900 Pa·s. The ratio according to the invention of equivalents (monoalcohol to dialcohol) was 0.27. The content of soft groups was 17.0%, the average functionality of the polyfunctional isocyanate-reactive compounds was 2.

Examples 5–23

Examples 5–23 were performed in a similar manner to Example 4. Table 1 sets forth the quantities of components used in Examples 5–23. The quantities of stabilizer are not separately listed in Table 1 as the quantities used do not differ from those used in Example 4.

TABLE 1

Urethane acrylates according to the invention.

| Ex | Diol | Diisocyanate | Monool | Tg | eq monool/ eq polyol | Viscosity at 100° C. | Soft group content [%] | Polyol functionality |
|---|---|---|---|---|---|---|---|---|
| 5 | 9.80 g ED | 44.04 g TDI | 20.94 g HEA | 51.2° C. | 0.57 | 600 Pa · s | 5.9 | 2 |

TABLE 1-continued

Urethane acrylates according to the invention.

| Ex | Diol | Diisocyanate | Monool | Tg | eq monool/ eq polyol | Viscosity at 100° C. | Soft group content [%] | Polyol functionality |
|---|---|---|---|---|---|---|---|---|
| 6 | 7.10 g ED | 50.53 g W | 17.16 g HEA | 49.6° C. | 0.64 | 620 Pa·s | 7.8 | 2 |
| 7 | 7.43 g ED | 46.98 g IPDI | 20.38 g HEA | 48.8° C. | 0.73 | 180 Pa·s | 8.2 | 2 |
| 8 | 8.66 g ED | 41.53 g TDI | 24.59 g HPA | 51.3° C. | 0.67 | 450 Pa·s | 5.2 | 2 |
| 9 | 11.50 g ED | 48.19 g H6-XDI | 15.10 g HPA | 46.1° C. | 0.31 | 600 Pa·s | 16.1 | 2 |
| 10 | 11.30 g PD | 42.45 g TDI | 21.04 g HEA | 51.7° C. | 0.61 | 650 Pa·s | 8.2 | 2 |
| 11 | 8.52 g PD | 49.46 g W | 16.80 g HEA | 49.7° C. | 0.64 | 600 Pa·s | 9.7 | 2 |
| 12 | 9.65 g PD | 46.71 g IPDI | 18.42 g HEA | 52.6° C. | 0.63 | 450 Pa·s | 10.8 | 2 |
| 13 | 14.40 g PD | 46.04 g H6-XDI | 12.34 g HEA | 52.9° C. | 0.28 | 550 Pa·s | 19.4 | 2 |
| 14 | 15.48 g BD | 42.98 g TDI | 16.33 g HEA | 48.2° C. | 0.40 | 650 Pa·s | 12.8 | 2 |
| 15 | 12.49 g BD | 46.65 g IPDI | 15.64 g HEA | 50.4° C. | 0.48 | 200 Pa·s | 14.2 | 2 |
| 16 | 15.39 g NPG | 40.60 g TDI | 18.79 g HEA | 50.3° C. | 0.55 | 650 Pa·s | 13.7 | 2 |
| 17 | 13.19 g NPG | 44.94 g IPDI | 16.66 g HEA | 49.7° C. | 0.57 | 800 Pa·s | 15.4 | 2 |
| 18 | 21.85 g HD | 41.54 g TDI | 11.39 g HEA | 52.6° C. | 0.26 | 600 Pa·s | 20.7 | 2 |
| 19 | 15.38 g HD | 48.08 g W | 11.36 g HEA | 48.6° C. | 0.37 | 650 Pa·s | 17.9 | 2 |
| 20 | 22.26 g 2-Et-1,3-HD | 38.06 g TDI | 14.46 g HEA | 51.2° C. | 0.41 | 950 Pa·s | 22.7 | 2 |
| 21 | 19.52 g 2-Et-1,3-HD | 42.58 g IPDI | 12.68 g HEA | 50.2° C. | 0.41 | 800 Pa·s | 23.3 | 2 |
| 22 | 19.62 g H12-BPA | 36.23 g IPDI | 18.93 g HEA | 47.1° C. | 1.00 | 480 Pa·s | 2.9 | 2 |
| 23 | 25.85 g TCD | 36.24 g H6-XDI | 12.70 g HEA | 51.2° C. | 0.42 | 430 Pa·s | 6.9 | 2 |

Abbreviations:
ED = 1,2-ethanediol;
PD = 1,2-propanediol;
BD = 1,4-butanediol;
NPG = neopentyl glycol;
HD = 1,6-hexanediol;
2-Et-1,3-HD = 2-ethyl-1,3-hexanediol;
H12-BPA = perhydrobisphenol A;
TCD = 4,8-bis(hydroxymethyl)tricyclo[5.2.0(2.6)]decane (TCD alcohol);
TDI = Desmodur ® T80 (available from Bayer AG, Leverkusen, DE);
IPDI = Desmodur ® I (available from Bayer AG, Leverkusen, DE);
W = Desmodur ® W (available from Bayer AG, Leverkusen, DE);
H6-XDI = hexahydroxy-xylylene diisocyanate;
HPA = hydroxypropyl acrylate;
HEA = hydroxyethyl acrylate.

Comparative Examples 24–35

Comparative Examples 24–35 (not according to the invention) were performed in accordance with the noted patent Examples. Table 2 sets forth the quantities of components used in Comparative Examples 24–35. As illustrated in Table 2, the products are either not stable in storage (Tg<45° C., shown in bold) or do not exhibit a low viscosity (viscosity>1000 Pa·s, shown in bold). All the Comparative Examples 24–35 have the features not according to the invention of an equivalent ratio (monool to diol equivalent ratio) of >1.2 and/or a polyol functionality of >2.5.

TABLE 2

Urethane acrylates not according to the invention:

| Ex | eq monool/ eq polyol | Tg/ °C. | Soft group content [%] | Polyol functionality | Viscosity at 100° C./ Pa · s | Patent Example |
|---|---|---|---|---|---|---|
| 24 | 1.27 | <0 | 15.8 | 3 | 15 | DE-A 19 939 843, Ex. 1 |
| 25 | 1.65 | 21.4 | 4.6 | 2.4 | 7 | DE-A 19 939 843, Ex. 2 |
| 26 | 1.65 | 23.7 | 5.9 | 3 | 18 | DE-A 19 939 843, Ex. 3 |
| 27 | 1.65 | 18.5 | 4.9 | 3 | 12 | DE-A 19 939 843, Ex. 4 |
| 28 | 1.65 | 23 | 5.4 | 2.4 | 8 | DE-A 19 939 843, Ex. 5 |
| 29 | 1.67 | 51 | 8.4 | 3 | 3200 | EP-A 410 242, Ex. 1 |
| 30 | 3.00 | 35 | 4.1 | 3 | 170 | EP-A 410 242, Ex. 2 |
| 31 | 3.00 | 64 | 6.0 | 3 | >100000 | EP-A 410 242, Ex. 3 |
| 32 | 1.55 | 55 | 8.8 | 3 | 8000 | EP-A 410 242, Ex. 4 |
| 33 | 1.67 | 46 | 8.3 | 3 | 2000 | EP-A 410 242, Ex. 5 |
| 34 | 4.00 | 38 | 7.5 | 4 | 400 | EP-A 410 242, Ex. 6 |
| 35 | 1.00 | 43.7 | 4.0 | 3 | 400 | DE-A2 436 186, Ex. 1 |

Comparative Examples 36–38

Comparative Examples 36–38 were performed in a similar manner to Example 4. Table 3 sets forth the quantities of components used in Comparative Examples 36–38. The quantities of stabilizer are not separately listed in Table 3 as the quantities used do not differ from those in Example 4.

The feature common to the following Comparative Examples 36–38 not according to the invention which are stable in storage (Tg>45° C.) but do not exhibit a low viscosity (viscosity>1000 Pa·s, shown in bold) is the average polyol functionality not according to the invention of >2.5.

Comparative Example 39

Comparative Example 39 was produced in a similar manner to Example 4. Table 5 sets forth the quantities of components used in Comparative Example 39. The quantities of stabilizer are not separately listed in Table 4 as the quantities used do not differ from those in Example 4. The following Comparative Example 39 (not according to the invention) which is not stable in storage (Tg<45° C.), has the feature not according to the invention of a soft group content of >25%.

TABLE 3

Urethane acrylates not according to the invention

| Ex | Diol | Diisocyanate | Monool | Tg | eq monool/ eq polyol | Viscosity at 100° C. | Soft group content [%] | Polyol functionality |
|---|---|---|---|---|---|---|---|---|
| 36 | 12.07 g TMP | 40.31 g TDI | 22.40 g HEA | 49.9° C. | 0.71 | 9000 Pa · s | 5.00 | 3 |
| 37 | 9.46 g TMP | 47.76 g W | 17.56 g HEA | 53.1° C. | 0.71 | 6200 Pa · s | 7.4 | 3 |
| 38 | 10.51 g TMP | 44.78 g IPDI | 19.50 g HEA | 51.4° C. | 0.71 | 9000 Pa · s | 8.1 | 3 |

Abbreviations:

TMP = trimethylolpropane;

TDI = Desmodur ® T80 (available from Bayer AG, Leverkusen, DE);

IPDI = Desmodur ® I (available from Bayer AG, Leverkusen, DE);

W = Desmodur ® W (available from Bayer AG, Leverkusen, DE);

HEA = hydroxyethyl acrylate.

TABLE 4

Urethane acrylate not according to the invention:

| Ex | Diol | Diisocyanate | Monool | Tg | eq monool/ eq polyol | Viscosity at 100° C. | Soft group content [%] | Polyol functionality |
|---|---|---|---|---|---|---|---|---|
| 39 | 24.47 g HD | 45.31 g H6-XDI | 5.00 g HEA | 43.5° C. | 0.10 | 900 Pa·s | 31.9 | 2 |

Abbreviations:

HD = 1.6 hexanediol;

H6-XDI = hexahydroxyxylylene diisocyanate;

HEA = hydroxyethyl acrylate.

Example 40
Short Sprayability Test

Powder sprayability was rapidly and simply tested by finely grinding the material in a mortar and placing a small pile (approx. 0.1 g of powder) of the finely ground material in an aluminum tray. 30 ml/s of air were pumped through a glass pipette with a diameter of 1 mm at the extended end with a tube fitted to the other end and a pump. The stream of air was then directed towards the pile of powder at a distance of 0.5–1 cm. If the piled powder was blown away as fine grains, it was deemed to have passed the short sprayability test. Table 5 summarizes the results from measurements on Examples 9 and 35.

TABLE 5

Results for blocking resistance by means of a short sprayability test.

| Powder from Example | No heat treatment | Heat treated 40° C., 30 min | Heat treated, 40° C., 2 h | Heat treated, 40° C., 7.5 h | Heat treated, 40° C., 24 h |
|---|---|---|---|---|---|
| 9 (according to the invention) | sprayable | sprayable | sprayable | sprayable | not sprayable sprayable |
| 35 (not according to the invention) | sprayable | sprayable | not sprayable | not sprayable | not sprayable |

Example 41
Sample Description of the Coating Operation on the Basis of Example 3

The product from Example 3 was pulverised with a model CA 80a-2 pulverizer from Alpine. 98.25 wt. % of the pulverized urethane acrylate from Example 3, 1.0 wt. % of levelling agent Worlee® Add 101 (available from Worlee-Chemie GmbH, Lauenburg, D E) and 0.75 wt. % of photo-initiator Irgacure® 2959 (available from Ciba Specialty Chemicals Inc., Basel, C H) were weighed out into a premix container and premixed in a Prism® Pilot 3 premixer (settings: 30 s, 2500 rpm). Extrusion was then performed in an APV NEF 950059 701/1 extruder with the temperature settings: zone 1, set value: 60° C.; zone 2, set value: 80° C.; speed of shafts: 300 rpm; measured melt temperature: 89° C.; feed setting: 4.5; average extruder load: 50%. The resultant chips were ground in a model ICM 4 mill from Neumann & Esser (pneumatic classifier 20 m/s, rotor 80 m/s) and screened with a 120 µm screen and immediately sprayed with an ITW Gema gun (50–60 mV, variable pressure, variable feed) onto a wooden sheet pretreated with an intermediate coating based on Roskydal® 500 A (available from Bayer AG, Leverkusen, DE). The film was fused in 15 minutes in a circulating air oven at 110° C. and the hot wooden sheet was irradiated with UV light using an IST S131 P-7FO unit (CK normal 2, belt speed 10 m/min). The film was immediately hard and, after cooling to room temperature and 60 minutes storage, was evaluated. The film thickness obtained was greater than 60 µm. Solvent resistance was evaluated with a cotton wool swab soaked in butyl acetate which was moved over the film in 100 to-and-fro strokes under a load of approximately 1 kg. The film was solvent- and scratch-resistant.

Example 42
OEM Powder Coating (Automotive Coating Tests)

The binder according to the invention of Example 3 was processed as in Example 41 to yield a powder coating. A particle size of Ø50%=23 µm was determined and the powder coating was applied electrostatically onto a metal test sheet provided with a black base coat. After exposure to the fusion conditions stated in Table 6, the coating was cured with different UV intensities and then tested for resistance to scratching and chemicals.

TABLE 6

Testing of scratch resistance and resistance to chemicals for automotive clear coat applications.
UV powder coating roduced from Example 3 according to Example 41

| | Fusion temperature | | | | | |
|---|---|---|---|---|---|---|
| | 10 min, 110° C. | | | 10 min, 125° C. | | |
| | Test no. | | | | | |
| | 1 | 2 | 3 | 4 | 5 | 6 |
| UV intensity (mJ/cm²) | 476 | 969 | 1950 | 476 | 969 | 1950 |
| Clear coat thickness | 71 μm | 63 μm | 60 μm | 60 μm | 59 μm | 41 μm |
| Scratch resistance*** | | | | | | |
| 20° gloss: | | | | | | |
| before | 75 | 77 | 72 | 77 | 77 | 76 |
| after | 46.7 | 54.4 | 47.5 | 61.6 | 61.4 | 59.1 |
| Difference | 28.3 | 22.6 | 24.5 | 15.4 | 15.6 | 16.9 |
| Resistance to 38% sulfuric acid** | 0 | 0 | 0 | 0 | 0 | 0 |
| Solvent attack* | | | | | | |
| 1 min | 3 3 3 3 3 | 3 3 3 3 3 | 1 3 3 3 3 | 3 3 3 3 | 2 3 3 3 3 | 1 3 3 3 2 |
| 5 min | 3 3 3 | 3 3 3 | 3 3 3 | 3 3 3 | 3 3 3 | 3 3 3 |

The evaluation scale means:

0: unchanged;

1: very slightly changed (swelling ring is very weak, only discernible from very slight trace, swelling ring is clearly interrupted);

2: slightly changed (swelling ring is discernible in light, traces of scratches discernible);

3: moderately changed (continuous swelling ring clearly discernible, slightly scratchable);

4: severely changed (continuous swelling ring very distinct, scratchable);

5: very severely changed (coating can be scratched through); and

5-: film completely destroyed (severely swollen, wrinkling, solvent attacked).

*Solvent attack:

A wooden stand with four glass tubes clamped in a vertical position (external φ approx. 15 mm) containing the following solvents with increasing solvency: 1) xylene; 2) 1-methoxy-2-propyl acetate; 3) ethyl acetate; and 4) acetone. The tubes were closed with a cotton wool swab. The tubes were placed on the clear coat film in such a manner that the open ends of the tubes with the cotton wool plugs rested on the clear film. It was important for the solvents to wet the film. After 1 and 5 minutes, these glass tubes were removed and the solvent residues wiped off with an absorbent cloth. The coating surfaces were evaluated in accordance with the stated scheme.

**Sulfuric acid resistance:

1 drop 38% sulfuric acid was placed on the coating film, covered with a watch glass and left there for 24 hours at room temperature. The test surface was then cleaned with a cotton swab under cold running water, dried and evaluated in accordance with the stated scheme.

***Scratch resistance:

The method for determining scratch resistance used here was devised by the DFO (Deutsche Forschungsgesellschaft für Oberflächenbehandlung) working party in accordance with DIN 55668, method for testing the scratch resistance of coatings using a laboratory washing system. The test rig was obtained from Amtec Kistler GmbH, D-86931 Prittriching. The moving test sheet was intentionally scratched under the specified conditions with a rotating brush similiar to that in a car wash system with the addition of a silica flour/water dispersion (Sikron SH 200 ultrafine silica flour, Amtec Kistler GmbH). The test surfaces, which were cleaned with ethanol, were subjected to a gloss measurement before and after scratching.

Examples 43–45
Curing with UV and/or Thermally with Free Radical Formers

Table 7 summarizes the formulation of powder coatings according to the invention based on the urethane acrylate according to Example 3, which was however produced without phenolic stabilizer. The levelling additive, photoinitiator and peroxide were incorporated in an aluminium reaction vessel at 115° C./1 h.

TABLE 7

Composition of the powder coatings to be cured thermally and/or with UV light

| | Example 3* | Worless Add 101[a] | Darocur 1173[b] | Peroxan DB[c] |
|---|---|---|---|---|
| Ex. 43 | 97% | 1% | 2% | |
| Ex. 44 | 98% | 1% | | 1% |
| Ex. 45 | 96% | 1% | 2% | 1% |

*Synthesis of urethane acrylate according to the invention in a similar manner to Example 3, but without phenolic stabilizers;
[a]Polyacrylate-based levelling auxiliary substance available from Worlee-Chemie GmbH, Lauenburg, Germany;
[b]2-Hydroxy-2-methyl-1-phenyl-1-propanone, product of Ciba Spezialitatenchemie, Lampertheim, Germany;
[c]Di-tert.-butyl peroxide (Peroxan ® DB, available from Pergan GmbH, Bocholt, Germany)

These powder coatings were then ground in a mortar and screened onto glass sheets. The powder coating was fused at 120° C. within 20 minutes and (a) subsequently no further treatment; or (b) only UV cured (belt unit, 1 light source, mercury vapour high pressure lamp 80 W/cm of lamp length [CK light source, IST, Metzingen, DE], irradiated twice at a belt speed of 5 m/min); or (c) heat treated at 140° C. for 15 minutes; or (d) heat treated at 160° C. for 15 minutes; or combinations of (b) and (c) or (d) were used.

TABLE 8

Resistance values of the thermally and/or UV-light curing powder coatings of the composition according to Table 7:

| | To-and-fro strokes with acetone |
|---|---|
| Ex. 43 | |
| (a) | <20 |
| (b) | <200 |
| (b) + (c) | <200 |
| (c) | <20 |
| (d) | <20 |
| Ex. 44 | |
| (a) | <20 |
| (b) | 50 |
| (b) + (c) | 100 |
| (c) | <50 |
| (d) | 100 |
| Ex. 45 | |
| (a) | <20 |
| (b) | 100 |
| (b) + (c) | 200 |
| (c) | <20 |
| (d) | 100 |

(a) subsequently no further treatment;
(b) only UV cured (belt unit, 1 light source, mercury vapour high pressure lamp 80 W/cm of lamp length [CK light source, IST, Metzingen, DE], irradiated twice at a belt speed of 5 m/min);
(c) heat treated at 140° C. for 15 minutes; and
(d) heat treated at 160° C. for 15 minutes.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A binder for a powder coating composition comprising at least one urethane acrylate having a glass transition temperature of between 45 and 80° C. which is curable with high energy radiation and which, without the additives conventional in a coating formulation, exhibits a melt viscosity η at 100° C. of less than 1000 Pa·s, provided that the urethane acrylate is not the reaction product of 1 mole of trimethylol-propane, 3 moles of toluene diisocyanate and 3 moles of hydroxyethyl methacrylate; wherein the binder composition comprises the reaction product of
A) one or more di- or polyisocyanates or mixtures thereof, optionally with the addition of one or more monoisocyanates;
B) one or more di- or polyfunctional isocyanate-reactive compounds or mixtures thereof; and
C) one or more monofunctional isocyanate-reactive compounds;
wherein 1) the ratio of NCO groups in A) to the sum of the equivalents of isocyanate-reactive groups in B) and C) is between 0.8 and 1.2 and (meth)acryloyl groups are present either in B) or C) or in both B) and C), such that 2) the ratio of the equivalents of isocyanate-reactive groups on monofunctional compounds C) to the equivalents of isocyanate-reactive groups on the di or polyfunctional compounds B) is less than 1.2 and 3) the di or polyfunctional isocyanate-reactive compounds B) have an average functionality of less than 2.5; and 4.) the proportion by weight of soft groups in the di- or polyfunctional isocyanates and in the di- or polyisocyanate-reactive components is less than 25 wt. %, based on the total weight of A), B) and C).

2. A process for preparing a binder for a powder coating composition from polyurethanes containing (meth)acryloyl groups without using organic solvents which is curable with high energy radiation and which, without the additives conventional in a coating formulation, exhibits a melt viscosity η at 100° C. of less than 1000 Pa·s, by reacting:
A) one or more di- or polyisocyanates or mixtures thereof, optionally with the addition of one or more monoisocyanates;
B) one or more di- or polyfunctional isocyanate-reactive compounds or mixtures thereof; and
C) one or more monofunctional isocyanate-reactive compounds;
wherein 1.) the ratio of NCO groups in A) to the sum of the equivalents of isocyanate-reactive groups in B) and C) is between 0.8 and 1.2 and (meth)acryloyl groups are present either in B) or C) or in both B) and C), such that 2.) the ratio of the equivalents of isocyanate-reactive groups on monofunctional compounds C) to the equivalents of isocyanate-reactive groups on the di or polyfunctional compounds B) is less than 1.2 and 3.) the di or polyfunctional isocyanate-reactive compounds B) have an average functionality of less than 2.5; and 4.) the proportion by weight of soft groups in the di- or polyfunctional isocyanates and in the di- or polyisocyanate-reactive components is less than 25 wt. %, based on the total weight of A), B) and C).

3. A coating composition comprising the binder of claim 1.

4. A coating composition comprising the binder produced by the process of claim 2.

5. A coating composition comprising the binder of claim 1 and at least one polyester, polyacrylate, polyether, polyamide, polyurethane or polycarbonate.

6. A coating composition comprising the binder produced by the process of claim 2 and at least one polyester, polyacrylate, polyether, polyamide, polyurethane or polycarbonate.

7. A coating comprising the binder of claim 1.

8. A coating comprising the binder produced by the process of claim 2.

9. A coating comprising the binder of claim 1 and at least one polyester, polyacrylate, polyether, polyamide, polyurethane or polycarbonate.

10. A coating comprising the binder produced by the process of claim 2 and at least one polyester, polyacrylate, polyether, polyamide, polyurethane or polycarbonate.

11. A curing composition comprising the binder of claim 1.

12. A curing composition comprising the binder produced by the process of claim 2.

13. A curing composition comprising the binder of claim 1 and at least one polyester, polyacrylate, polyether, polyamide, polyurethane or polycarbonate.

14. A curing composition comprising the binder produced by the process of claim 2 and at least one polyester, polyacrylate, polyether, polyamide, polyurethane or polycarbonate.

15. A substrate coated with a coating composition comprising the binder of claim 1.

16. A substrate coated with a coating composition comprising the binder produced by the process of claim 2.

17. A substrate coated with a coating composition comprising the binder of claim 1 and at least one polyester, polyacrylate, polyether, polyamide, polyurethane or polycarbonate.

18. A substrate coated with a coating composition comprising the binder produced by the process of claim 2 and at least one polyester, polyacrylate, polyether, polyamide, polyurethane or polycarbonate.

* * * * *